United States Patent [19]

Abell

[11] Patent Number: 4,698,784
[45] Date of Patent: Oct. 6, 1987

[54] SYNTACTIC DEVICE FOR CHAIN CALCULATIONS

[75] Inventor: Steven T. Abell, Corvallis, Oreg.

[73] Assignee: Hewlett-Packard Company, Palo Alto, Calif.

[21] Appl. No.: 568,669

[22] Filed: Jan. 6, 1984

[51] Int. Cl.⁴ .................................................. G06F 7/00
[52] U.S. Cl. ........................................ 364/900; 364/200; 364/706
[58] Field of Search ... 364/709, 710, 706, 200 MS File, 364/900 MS File

[56] References Cited

U.S. PATENT DOCUMENTS

| | | |
|---|---|---|
| 3,839,630 | 10/1974 | Olander, Jr. et al. ............ 235/156 |
| 3,996,562 | 12/1976 | Reach et al. ..................... 364/200 |
| 4,007,443 | 2/1977 | Bromberg et al. ............... 364/200 |
| 4,145,742 | 3/1979 | Olander, Jr. et al. ............ 364/709 |
| 4,309,761 | 1/1982 | Reach et al. ..................... 364/900 |
| 4,366,553 | 12/1982 | Spangler et al. ................. 364/900 |

*Primary Examiner*—Gareth D. Shaw
*Assistant Examiner*—Christina Eakman
*Attorney, Agent, or Firm*—Douglas L. Weller

[57] ABSTRACT

A computing system using a syntactic device for chain calculations with displaying an intermediate result to monitor the progress of the calculation is provided. In one embodiment, if an operator wants to take sine of a result of calculations, the operator needs only type "SIN( )" to obtain the answer. The empty parenthesis dilimits a null subexpression, which the computing system, using the syntectic device, interprets as the result function.

7 Claims, 5 Drawing Figures

SYNTACTIC DEVICE FOR CHAIN CALCULATIONS

BACKGROUND OF THE INVENTION

This invention relates to a computing system, and more particularly to a syntactic device for chain calculations which displays an intermediate result to allow monitoring of the progress of calculations.

In addition, the invention relates to the use of implied result. By implied result is meant the fact that the computing system replaces null arithmetic expressions with the final result of an arithmetic expression most recently completed by the computing system.

In the prior art, when using an expression-oriented calculator, such as a calculator which has function keys, a problem of convenience arises when carrying forward the result of a calculation. For example, if an operator computes $(4 \times 5) + 10$, and then wants to take the sine of this result, the operator must follow specific steps. He would first need to calculate the intermediate result, $(4 \times 5) + 10$, and store the intermediate result in a Result register (RES). He would then calculate the sine of the intermediate result by typing "SIN(RES)". The present invention eliminates the need for result register RES, and allows for more convenient use of a calculator.

SUMMARY OF THE INVENTION

In accordance with a preferred embodiment of the present invention there is provided a computing system which is capable of displaying an intermediate result to monitor the progress of a computation. In the syntactic device, an operator keys in the entire expression as in BASIC, a popular programming language. However, whenever the portion of the expression already keyed in can be evaluated, the computation system automatically displays the intermediate result. The operator then closes the computation to obtain the final result.

The ability to monitor the progress of a calculation by viewing intermediate results provides important advantages over viewing only the final result. Particularly, an operator can see if a calculation is progressing as expected, allowing the operator to catch errors that otherwise might remain hidden.

In addition, the preferred embodiment describes use of implied result. In terms of the above example, given in the Background, the sine of $(4 \times 5) + 10$ could be calculated without the use of a result register (RES). The sine could be calculated by calculating the intermediate result (i.e., typing $4 \times 5 + 10$, and closing the intermediate result, e.g., pushing an END LINE key) and then typing in SIN ( ). The preferred embodiment of the invention will replace the null expression "( )" with the intermediate result $(4 \times 5 + 10)$.

In the present invention, therefore, the result of the previous expression can be easily included in the current expression, just by giving empty parentheses. Hence, the present invention provides us with more convenient syntactic device.

DESCRIPTION OF THE PREFERRED EMBODIMENT

Figure 1:
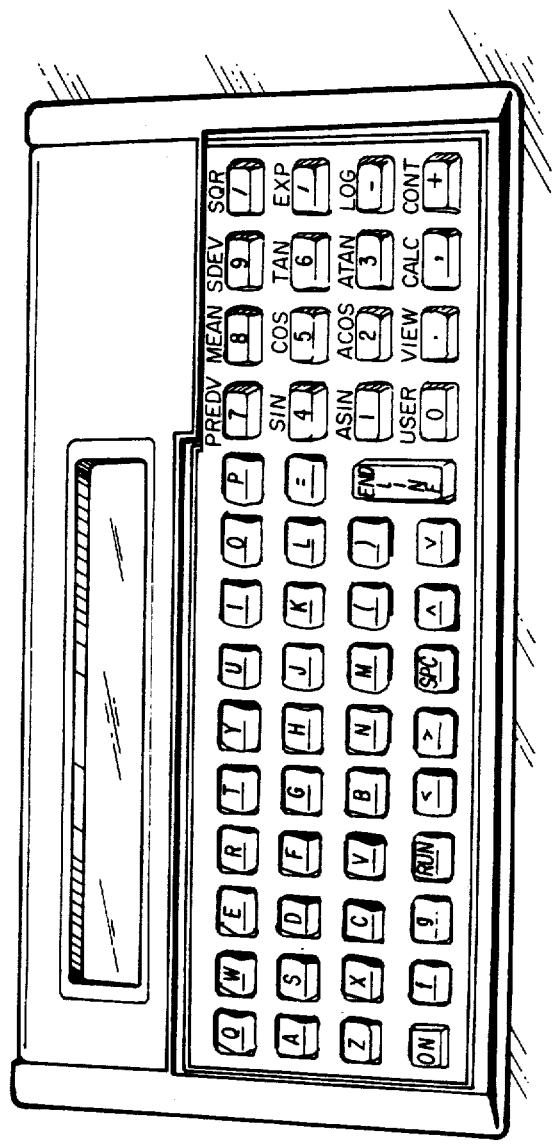
FIG. 1 is a perspective view of a preferred embodiment of the present invention describing key functions of the syntactic device.

In FIG. 1, a perspective view of a handheld computer using a syntactic device for chain calculations is shown. In the embodiment of the invention the handheld computer features an enhanced BASIC language and a calculation mode. The operator can evaluate a numeric expression with the handheld computer within two different frameworks. Each uses the normal algebraic precedence of operators. The BASIC mode is the familiar framework shared by most BASIC computers. In the BASIC mode an operator keys in the entire expression. Then the operator presses the END LINE key shown in FIG. 1 to evaluate the expression and display the result. The CALC mode, which may be entered into by depressing a CALC key shown in FIG. 1, facilitates evaluation in many ways not available in BASIC mode, including the display of intermediate results while the expression is being keyed in.

Figure 2:
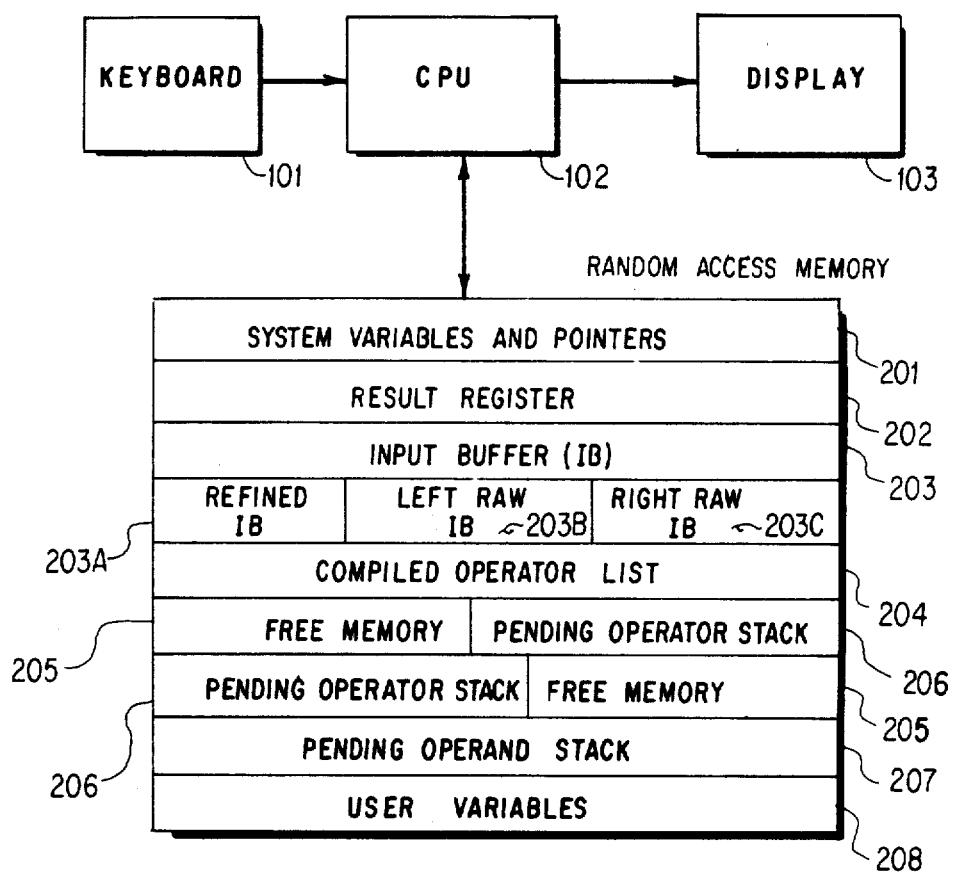
FIG. 2 is a block diagram of the syntactic device describing the system configuration.

In FIG. 2 the system configuration of the handheld computer shown in FIG. 1 is more precisely described. The system includes keyboard 101, central processing unit (CPU) 102, display 103, and random access memory (RAM) 104. The keyboard 101 interfaces with an operator and is capable of entering numbers and a desired operation into the CPU 102 as shown in FIG. 1. Input information from the keyboard 101 can be displayed on the display 103. FIG. 2 shows a layout of memory areas within RAM 104 while the computer is in CALC mode. The RAM 104 includes system variables, pointers 201, result register 202, input buffer 203, compiled operator list 204, free memory 205, pending operator stack 206, pending operand stack 207 and user variables 208. The input buffer (IB) 203 consists of refined IB 203A, left row IB 203B, and right row IB203. The refined input buffer 203A contains input characters which have been processed. The left row IB 203B contains all unprocessed characters which have been explicitly entered. The right row IB 203C contains unprocessed right delimiters, which are placed by the system in anticipation of their arrival. The pending operator stack 206 shuttles from one end of the free memory 205 to the other, permitting easy access to the operand stack 207.

In the CALC mode of the embodiment, the implied result is recognized in several situations by chain calculations as shown in Table I.

TABLE I

| (1) | Between parentheses | ( ) |
|---|---|---|
| (2) | Between a left parenthesis and a comma | (, |
| (3) | Between commas | ,, |
| (4) | Between a comma and a right parenthesis | ,) |
| (5) | Where there is no expression at all | |

The implied result is intended to be used primarily in the argument lists of functions, but it can be invoked anywhere by typing "( )". This feature is easily extended to cases where the subexpression contains only monadic operators (the sign operators "+" and "−", along with the logical operator "NOT"). The rule is that implied result is invoked when a subexpression contains no operands. Monadic operators are applied to the result, as expected. Therefore, the CALC mode is the external manifestation of an operator precedence parser for arithmetic expressions. This parser examines a particular bi-state variable, which determines whether an operator or an operand is expected as the next input from the user. The following state transition Table II specifies the syntactic device.

In Table II, the state is defined by two data. The first datum is the type of input that is being parsed, i.e., an operator or an operand. The second datum is the current status of the expression, i.e., null or non-null. Therefore there are four states in which the parse routine could be. These are listed in Table II as: Operand, Null; Operand, Non-null; Operator, Non-null; and Operator, Null. The parse routine, however, is written so that the last state, Operator, Null, will never occur.

In addition to the current state, Table II also gives the next state for each received input. The input may include any of the following: a monadic operator (i.e., an operator that works on a single operand), a number, a simple variable, an array variable, a function without parameters, a function with parameters, a left parenthesis, a right parenthesis, a comma, an endline, or a binary operator. The new state will be one of the three states which are allowed to occur, as discussed above. Of course, each operation will be checked for appropriate syntax. Thus, certain operators will require commas (for instance operators which work on arrays) and/or parenthesis depending upon accepted syntax usage. For a more general discussion of parsing, see for instance: *Principles of Compiler Design*, Alfred V. Aho, Jeffrey D. Ullman, Addison-Wesley Publishing Company, 1978, particularly chapter 5.

TABLE II

STATE TRANSITION
Initial State: Parse = operand, Expression = null

| Input | Parse | Expression |
|---|---|---|
| State: Operand, Null | | |
| monadic operator | operand | no change |
| number | operator | non-null |
| simple variable | operator | non-null |
| array variable | operand | null |
| function w/o parameters | operator | non-null |
| function w/ parameters | operand | null |
| left parenthesis | operand | null |
| *right parenthesis | operator | non-null |
| *comma | operand | null |
| *endline | TERMINATE | |
| NO OTHER INPUT ALLOWED | | |
| State: Operand, Non-null | | |
| monadic operator | operator | no change |
| number | operator | non-null |
| simple variable | operator | non-null |
| array variable | operand | null |
| function w/o parameters | operator | non-null |
| function w/ parameters | operand | null |
| left parenthesis | operand | null |
| NO OTHER INPUT ALLOWED | | |
| State: Operator, Non-null | | |
| binary operator | operand | non-null |
| right parenthesis | operator | non-null |
| comma | operand | null |
| endline | TERMINATE | |
| NO OTHER INPUT ALLOWED | | |
| State: Operator, Null | | |
| CANNOT OCCUR | | |

In Table II, the states labeled by (*) force the result function since they recognize null subexpressions. The admissibility of the right delimiters (right parenthesis, comma, and endline) is also dependent on information not shown in the state Table II. This other information has to do with whether said right delimiters are anticipated.

Figure 3:
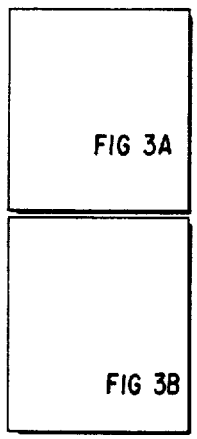
FIG. 3 consists of FIGS. 3A and 3B.
Figure 3A:
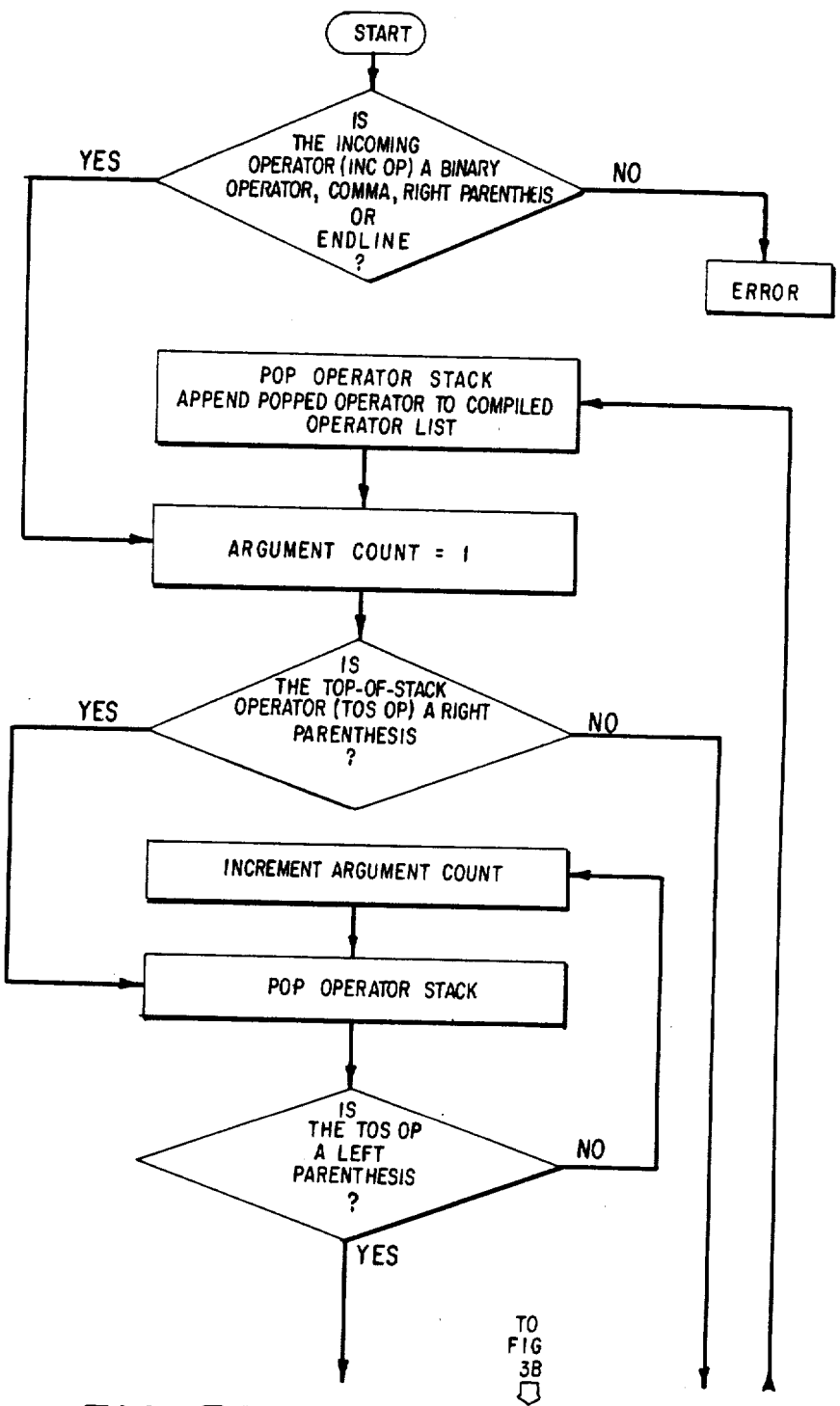
FIGS. 3A and 3B are a flow chart illustrating functions of the system.
Figure 3B:
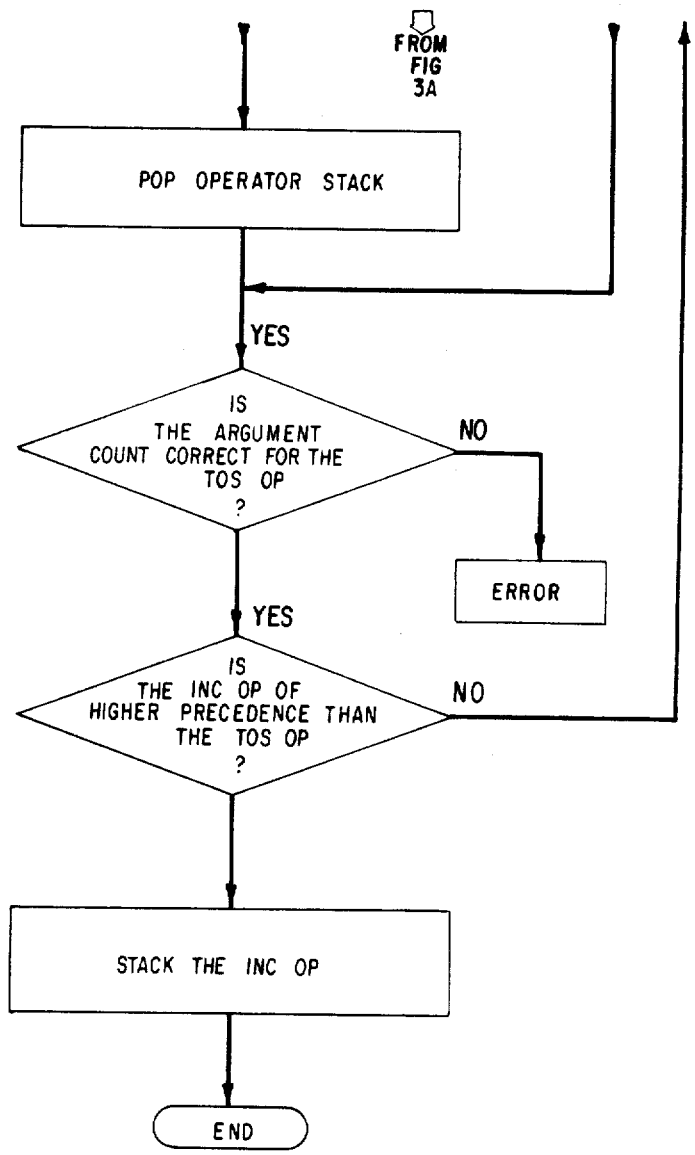

The flowchart shown in FIGS. 3A and 3B shows how operator precedence is determined by the parse routine. The parse routine compares the incoming operator (INC OP) against the operator at the top of stack (TOS OP) to determine which has the higher precedence. Appropriate action is then taken.

TABLE III

7 + (2* ANGLE ( , ) )

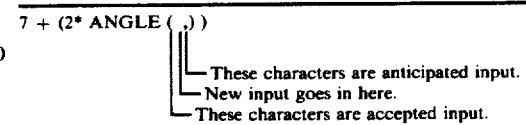

This is precisely the kind of situation where result comes into play. The left parenthesis indicates a new subexpression. Entering a comma at this point will inject the previous result, whatever it may be, into this position.

In another example of the CALC mode calculation as compared with the BASIC mode calculation, the embodiment of the invention is more clearly understood. Namely, in the BASIC mode calculation when an operator inputs the expression "7+4−9*(15−7/3)", the display shows same expression on the screen and is ready for evaluation. After the operator keys in the ENDLINE, the result is "−103". On the contrary, in case of the CALC mode calculation, when an operator keys in "7+4−", the display shows the answer "11" on the screen. When the operator further keys in "9*(", the computer does not evaluate "11−9", since to do so would violate operator precedence. Thereafter when the operator keys in "15−7/3)", the computer shows an intermediate result of "11−9*(12.67)" on the display because of the closing parenthesis. Then after the operator keys in the ENDLINE, the computer evaluates and displays the final result of "−103".

What is claimed is:

1. In a computing system capable of calculating chain calculations wherein a final result of a first arithmetic expression may be dependent upon a previous result of a last calculated arithmetic expression, an apparatus comprising:
   storage means for storing the previous result of the last calculated arithmetic expression;
   first means for entering the first arithmetic expression;
   second means for verifying a syntactic correctness of the first arithmetic expression entered by the first means, wherein the second means is able to detect a first location in the first arithmetic expression where according to the syntax there should have been a variable, but the variable is absent;
   third means for computing the final result;
   said third means further comprising interpreting means for replacing the absent variable at the first location with the previous result of the last calculated arithmetic expression transferred from the storage means to compute the final result;
   fourth means for displaying the final result computed by the third means; and
   fifth means for transferring the final result to the storage means, wherein the final result will then be the previous result of a next arithmetic expression.

2. An apparatus according to claim 1, wherein the first location is between parentheses.

3. An apparatus according to claim 1, wherein the first location is between a left parenthesis and a comma.

4. An apparatus according to claim 1, wherein the first location is between commas.

5. An apparatus according to claim 1, wherein the first location is between a comma and a right parenthesis.

6. An apparatus according to claim 1, wherein the first location follows a monadic operator.

7. A computing device which performs a method for evaluating a first arithmetic expression, the method comprising:

detecting a first location in the first arithmetic expression where according to the syntax there should have been a variable, but the variable is absent;

interpreting and computing a first result of the first arithmetic expression;

storing the first result of the first arithmetic expression;

substituting a prior result of a prior arithmetic expression into the first location within the first arithmetic expression; and, utilizing the prior result in place of the absent variable to interpret and compute the first result.

* * * * *